United States Patent
Higashikubo et al.

[11] Patent Number: 6,121,335
[45] Date of Patent: Sep. 19, 2000

[54] NUCLEATOR FOR FOAMING, FOAMABLE COMPOSITION, FOAM AND PRODUCTION METHOD OF FOAM

[75] Inventors: Takashi Higashikubo; Hirokazu Kuzushita, both of Amagasaki, Japan

[73] Assignee: Mitsubishi Cable Industries, Ltd., Hyogo, Japan

[21] Appl. No.: 09/386,508

[22] Filed: Aug. 31, 1999

[30] Foreign Application Priority Data

Aug. 31, 1998 [JP] Japan .................................. 10-244754

[51] Int. Cl.⁷ ...................................................... C08J 9/00

[52] U.S. Cl. ................................ 521/79; 521/81; 521/92; 521/134; 521/138; 521/145; 521/142; 521/143

[58] Field of Search ..................................... 521/134, 138, 521/81, 79, 145, 92, 143, 142

[56] References Cited

FOREIGN PATENT DOCUMENTS 9-55120  2/1997  Japan .

*Primary Examiner*—Morton Foelak
*Attorney, Agent, or Firm*—Wenderoth, Lind & Ponack, L.L.P.

[57] ABSTRACT

A nucleator for foaming comprising a fluororesin powder comprising particles having a particle size of 0.1–0.5 μm in a proportion of at least 50% by number and containing particles having a particle size of not less than 5 μm in a proportion of not more than 40% by number, a foamable composition comprising this nucleator and an organic polymer, a foam made therefrom, and a production method of the foam. The nucleator of the present invention can produce a foam made from an organic polymer improved in expansion ratio, fineness of the cells, uniformity of foaming and the like by the use of an extremely small amount thereof. It is preferably used for forming an insulating foam layer of a high frequency coaxial cable.

11 Claims, 1 Drawing Sheet

NUCLEATOR FOR FOAMING, FOAMABLE COMPOSITION, FOAM AND PRODUCTION METHOD OF FOAM

TECHNICAL FIELD OF THE INVENTION

The present invention relates to a nucleator for foaming, a foamable composition, a foam and a production method of a foam. More particularly, the present invention relates to a nucleator for foaming, which is capable of forming a foam having superior electric properties and mechanical strength that permits production of an insulating foam layer for an electric communication cable, particularly a high frequency coaxial cable, a foamable composition comprising this nucleator, a foam obtained by the use of this nucleator and a production method of this foam.

BACKGROUND OF THE INVENTION

An insulating foam layer of a high frequency coaxial cable is requested to have not only superior electric properties, such as dielectric constant and dielectric tangent, but also a certain level of mechanical strength that prevents deformation and buckling when an external force is applied to this cable.

Conventionally, an insulating foam layer of a high frequency coaxial cable has been produced by mixing a nucleator with a low polarity organic polymer, such as polyethylene, as a foamable material and extruding the mixture in the presence of a foaming agent. As the nucleator to be used for this extrusion foam forming, so-called chemical foaming agents such as 4,4'-oxybisbenzenesulfonylhydrazide (OBSH), azodicarbonamide (ADCA) and the like, and boron nitride have been used.

OBSH and ADCA are decomposed by the high temperature heat in an extruder and form a number of fine nuclei in an organic polymer, which cause uniform foaming of the organic polymer. However, OBSH produces water upon thermal decomposition to degrade electric properties of the insulating foam layer, and ADCA also forms various high polarity decomposition residues upon thermal decomposition, again degrading electric properties of the insulating foam layer.

In contrast, boron nitride is superior in electric properties and heat resistance, and is free of problems associated with OBSH and ADCA. On the other hand, boron nitride is expensive and makes the foam produced therewith more expensive than conventional products. In addition, its property as a nucleator is not necessarily sufficient. To be specific, the foams obtained therefrom generally have greater cell diameter, and unsatisfactory dispersibility of the cells (uniformity of foaming). In general terms, foams having cells having a greater diameter and less uniformity of foaming have less mechanical strength and are susceptible to deformation. This has a consequence that a cable having an insulating foam layer often suffers from buckling of the insulating foam layer upon bending.

In an attempt to overcome various problems associated with the conventional nucleators, the present inventors proposed production of a high frequency coaxial cable having a polyethylene insulating foam layer using a fluororesin powder having an average particle size of 0.1–100 $\mu$m as a nucleator (JP-A 9-55120). Inasmuch as a fluororesin powder is, like boron nitride, superior in electric properties and heat resistance, it is free of the problems OBSH and ADCA are suffering from. In addition, it is strikingly more economical than boron nitride, so that a high frequency coaxial cable having a foamed thermoplastic resin insulating layer is produced at a low cost.

It is therefore an object of the present invention to provide a nucleator for foaming, which improves expansion ratio, fineness of the cell and the like, and which, by the use of a small amount thereof, is capable of producing a foam made from an organic polymer and improved in fineness of the cells, uniform foaming and the like, a foamable composition comprising this nucleator, a foam obtained by the use of this nucleator and a production method of his foam.

SUMMARY OF THE INVENTION

From the study of a fluororesin powder by the present inventors, the following have been found for the first time.
1. A fine fluororesin powder having a particle size of not more than 1 $\mu$m immediately after production tends to agglomerate depending on the handling and preservation conditions thereafter and form large particles.
2. The large fluororesin particles and a fluororesin powder containing such particles in a large amount show poor properties as a nucleator, as a result of which foams have cells having greater diameters and foaming becomes non-uniform.
3. A fluororesin powder containing particles having a particle size of about 0.1–0.5 $\mu$m is, by the use of a small amount thereof, capable of producing a high quality organic polymer foam wherein fine cells are uniformly dispersed.

The present invention has been completed based on the above findings.

The above-mentioned object can be achieved by the following nucleator for foaming, foamable composition, foam and production method of the foam.

Accordingly, the present invention provides the following.
(1) A nucleator for foaming comprising a fluororesin powder comprising particles having a particle size of 0.1–0.5 $\mu$m in a proportion of at least 50% by number and particles having a particle size of not less than 5 $\mu$m in a proportion of not more than 40% by number.
(2) The nucleator for foaming of (1) above, wherein the fluororesin powder has an average particle size of 0.2–10 $\mu$m.
(3) The nucleator for foaming of (1) or (2) above, wherein the fluororesin powder is at least one member selected from the group consisting of a polytetrafluoroethylene powder, a tetrafluoroethylene-perfluoroalkyl vinyl ether copolymer powder and an ethylene-tetrafluoroethylene copolymer powder.
(4) A foam which comprises a formable organic polymer and a fluororesin powder comprising particles having a particle size of 0.1–0.5 $\mu$m in a proportion of at least 50% by number and particles having a particle size of not less than 5 $\mu$m in a proportion of not more than 40% by number, in a proportion of 0.01–1 part by weight per 100 parts by weight of the organic polymer.
(5) The foam of (4) above, wherein the organic polymer is at least one member selected from the group consisting of a high density polyethylene, a low density polyethylene and a linear low density polyethylene.
(6) The foam of (4) above, wherein the expansion ratio is at least 50%.
(7) The foam of (4) above, wherein the foam is for an insulating foam layer of a coaxial cable.
(8) A coaxial cable having an insulating foam layer made from a formable organic polymer comprising a nucleator for foaming comprising a fluororesin powder comprising particles having a particle size of 0.1–0.5 μm in a proportion of at least 50% by number per 100 parts by weight of the organic polymer and particles having a particle size of not less than 5 μm in a proportion of not more than 40% by number per 100 parts by weight of the organic polymer.

(9) A production method of a foam, comprising mixing a formable organic polymer and a nucleator for foaming which comprises a fluororesin powder comprising particles having a particle size of 0.1–0.5 μm in a proportion of at least 50% by number and particles having a particle size of not less than 5 μm in a proportion of not more than 40% by number in a proportion of 0.01–1 part by weight per 100 parts by weight of the organic polymer, and extruding the mixture in the presence of a foaming agent from under a high pressure to a lower pressure.

(10) A foamable composition comprising a fluororesin powder comprising particles having a particle size of 0.1–0.5 μm in a proportion of at least 50% by number, particles having a particle size of not less than 5 μm in a proportion of not more than 40% by number and a formable organic polymer.

(11) The foamable composition of (10) above, wherein the fluororesin powder has an average particle size of 0.2–10 μm.

(12) The foamable composition of (10) above, wherein the fluororesin powder is at least one member selected from the group consisting of a polytetrafluoroethylene powder, a tetrafluoroethylene-perfluoroalkyl vinyl ether copolymer powder and an ethylene tetrafluoroethylene copolymer powder.

(13) The foamable composition of (10) above, wherein the organic polymer is at least one member selected from the group consisting of a high density polyethylene, a low density polyethylene and a linear low density polyethylene.

(14) The foamable composition of (10) above, wherein the fluororesin powder is contained in a proportion of 0.01–1 part by weight per 100 parts by weight of the organic polymer.

DETAILED DESCRIPTION OF THE INVENTION

Figure 1:
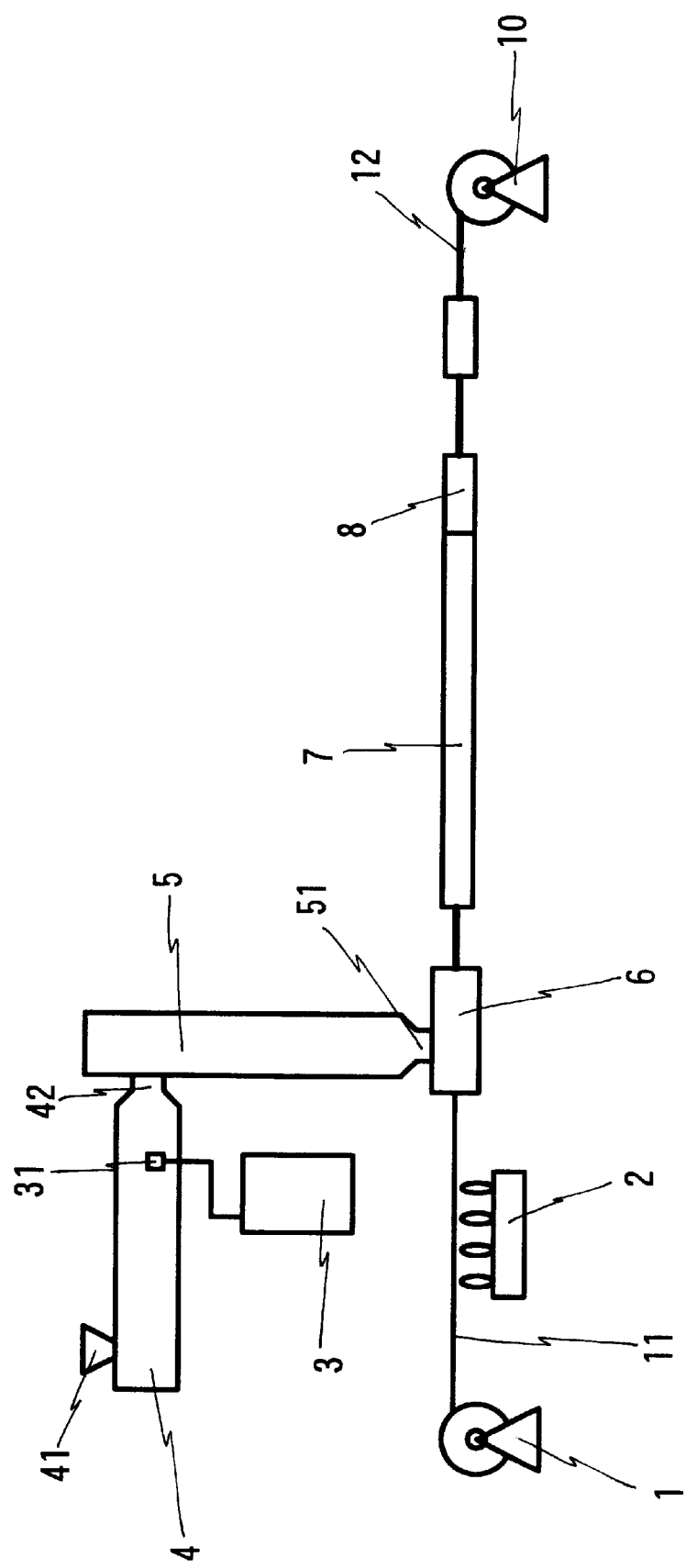
FIG. 1 shows one embodiment of the production apparatus of a coaxial cable, wherein 1 is a conductor delivery device, 2 is a conductor preheater, 3 is a foaming agent supply source, 31 is a foaming agent injection nozzle, 4 is a first extruder, 5 is a second extruder, 6 is a cross head of the second extruder, 7 is a condenser, 8 is a cable outer diameter measuring device and 10 is a winding up machine.

A fluororesin powder, as mentioned above, tends to agglomerate depending on the handling immediately after production or during transport and preservation conditions, and form large particles. In the following description, the particles that do not agglomerate with other particles but exist alone are to be referred to as primary particles and the particles that agglomerated with other particles and grew larger are to be referred to as secondary particles. The primary particles generally have a particle size of approximately 0.01–1 μm, though subject to variation depending on the production method of the fluororesin powder. The secondary particles comprise those having a particle size of not more than 1 μm, which comprise several primary fine particles having a particle size of less than 0.1 μm, those having a particle size of not more than 0.5 μm, those having a large particle size, which comprise many primary particles, and the like. The primary particles and the secondary particles contained in most of the commercially available fluororesin powders can be identified by microscopic observation.

The nucleator for foaming (hereinafter to be simply referred to as a nucleator) to be used in the present invention comprises fluororesin particles (hereinafter to be referred to as main component particles) having a particle size of 0.1–0.5 μm as a main component. The whole main component particles consist of primary particles, or secondary particles, or a mixture of the primary particles and the secondary particles at an optional mixing ratio. It should be noted here that a combination of the main component particles in a smaller content and the particles having a large particle size of not less than 5 μm, which are mostly secondary particles, in a larger content results in failure to produce an organic polymer foam having improved expansion ratio, fine cells, uniform foaming and the like. To avoid this, the content of the main component particles is set to at least 50% by number, preferably at least 70% by number, and the content of the particles having a greater particle size is set to not more than 40% by number, preferably not more than 20% by number, as calculated by the method to be mentioned later. The presence of fine particles having a particle size of less than 0.1 μm and medium particles having a particle size of greater than 0.5 μm but smaller than 5 μm is tolerated as long as the contents of the main component particles and particles having a greater particle size are within the above-mentioned ranges.

As is evident from the above-mentioned explanation, the nucleator of the present invention may consist of the main component particles alone or one or more from the above-mentioned fine particles having a medium particle size and particles having a large particle size. In any case, the fluororesin particles as a nucleator have an average particle size of 0.2–10 μm, particularly 0.2–5 μm, and preferably have finer cells for further improved fineness of the cells.

The nucleator of the present invention can be easily obtained by examining commercial fluororesin powders for the contents of particles having a particle size of 0.1–0.5 μm and those having a particle size of not less than 5 μm by the method to be mentioned later and selecting one having the contents within the above-mentioned range. Alternatively, commercial fluororesin powders may be applied to a classifier to mainly collect the particles having a particle size of 0.1–0.5 μm. As mentioned earlier, since a fluororesin powder may agglomerate depending on storage conditions, particularly self weight and external pressure, the nucleator of the present invention should be stored in a state where pressure is reduced as completely as possible, such as in a container made from glass, iron and the like, to a filling height of less than 50 cm. When the storage extends over a long period of time, the presence or otherwise of the progression of the agglomeration of the fluororesin powder should be checked.

In the present invention, the particle size of the respective fluororesin powders and contents thereof are determined by the following methods.

Determination of particle size and proportion (% by number) of fluororesin powder A dispersion comprising a fluororesin powder obtained by a dispersing treatment for about 2 minutes under ultrasonication of about 35–40 kHz and ethanol, wherein the fluororesin powder is contained in an amount to make a laser permeation (proportion of output light to incident light) of the dispersion 70–95%, is subjected to a microtrack particle size analyzer under relative refraction (see the following note) and flow type cell measurement mode to determine particle size ($D_1, D_2, D_3 \ldots$) of individual particles and the number ($N_1, N_2, N_3 \ldots$) of particles having each particle size based on the optical diffraction of the laser. In this case, the particle size (D) of individual particles is automatically measured by the microtrack particle size analyzer wherein particles having various shapes are measured in terms of the diameters of the corresponding spheres.

Note: Determination is done based on the ratio of diffraction ratio (about 0.99) of fluororesin powder to that of ethanol or according to the measure of the above-mentioned particle size analyzer which is the nearest to the ratio (e.g., 1.02).

Therefore, the proportion (% by number) of the particle size $D_1$ is expressed by the percentage of the number of these particles ($N_1$) to the number of the entire particles ($\Sigma N$). The proportion of the particles having a particle size of 0.1–0.5 $\mu$m is expressed by the percentage of the number of the particles having a particle size of 0.1–0.5 $\mu$m to the total number of the existing particles (EN). Similarly, the proportion of the particles having a particle size of not less than 5 $\mu$m is expressed by the percentage of the number of the particles having a particle size of not less than 5 $\mu$m to the total number of the existing particles ($\Sigma N$).

On the other hand, the average particle size of the nucleator of the present invention can be calculated using the total number of existing particles (ZN) and the total of the product of the cube of the particle size of respective particles and the total number of existing particles ($\Sigma ND^3$), according to the following formula (1).

$$\text{Average particle size } (\mu m) = (\Sigma ND^3 / \Sigma N)^{1/3} \quad (1)$$

The fluororesin constituting the nucleator of the present invention may be various polymers inclusive of a homopolymer and a copolymer of fluorine-containing monomers, which can provide a powder having the above-mentioned particle size.

Examples of fluororesin include polytetrafluoroethylene (PTFE), tetrafluoroethylene-perfluoroalkyl vinyl ether copolymer (PFA), ethylene tetrafluoroethylene copolymer (ETFE), tetrafluoroethylene-hexafluoropropylene copolymer (FEP), tetrafluoroethylene-ethylene copolymer, polyvinylidene fluoride (PVdF), polychlorotrifluoroethylene (PCTFE), chlorotrifluoroethylene-ethylene copolymer (ECTFE) and the like, wherein particularly PTFE, PFA and ETFE are preferable and PTFE is particularly preferable.

While the shape of the fluororesin powder is not particularly limited, it is preferable that the primary particles be spherical to produce a foam comprising fine cells and superior in uniform foaming.

The nucleator of the present invention is characterized in that, unlike the aforementioned OBSH and ADCA, it is free of occurrence of decomposition product since it is not decomposable by heat like boron nitride, and dramatically more advantageous than boron nitride in the amount to be used. The use of not more than about ½, sometimes less than that of boron nitride leads to the equivalent expansion ratio, or greater expansion ratio than by the use of boron nitride. In addition, finer and more uniform dispersion of cells than by the use of boron nitride can be achieved. The amount of the nucleator of the present invention varies depending on the desired expansion ratio of the formable organic polymer which is to be foamed (hereinafter this organic polymer is to be referred to as organic polymer to be foamed). When the desired expansion ratio is not less than 50%, it is about 0.01–1 part by weight, particularly 0.05–0.5 part by weight, per 100 parts by weight of the organic polymer to be foamed. The nucleator of the present invention can be used like other nucleators such as boron nitride. For example, it is homogeneously mixed with an organic polymer to be foamed and supplied to an extruder.

In the present invention, a nucleator having desired properties can be selected from the aforementioned various fluororesins and used. For example, the nucleator having a dielectric constant (20° C., 60 Hz) of not more than 2.5 is used and the organic polymer to be foamed having a low dielectric constant and low dielectric tangent (e.g., polyethylene) is used. As a result, a foam superior in electric properties, which can be used as an insulating foam layer of a high frequency coaxial cable, can be produced economically.

The foam of the present invention is made from an organic polymer to be foamed, which contains the above-mentioned nucleator in a proportion of 0.01–1 part by weight per 100 parts by weight of the organic polymer and has at least 50% expansion ratio. The organic polymer to be foamed is subject to no particular limitation as long as it can be formed by various methods, such as conventional extrusion forming using a screw for resin or rubber.

Typical examples thereof include resins such as polyolefins (e.g., polyethylene, polypropylene, polybutene, poly-4-methylpentene-1 and the like), thermoplastic resins (e.g., polystyrene, poly(vinyl chloride), poly(vinylidene chloride), ethylene-vinyl acetate copolymer, ethylene-ethyl acrylate copolymer and the like);

rubbers such as natural rubber, isoprene rubber, butyl rubber, ethylene-propylene copolymer rubber, ethylene-propylene-diene terpolymer rubber, styrene-butadiene copolymer rubber, acrylonitrile-butadiene copolymer rubber, ethylene-vinyl acetate copolymer rubber, ethylene-ethyl acrylate copolymer rubber, chlorosulfonated polyethylene rubber, epichlorohydrine rubber, silicone rubber, fluoro rubber and the like;

thermoplastic elastomers such as styrene thermoplastic elastomers such as ABA triblock elastomer or (AB)n X type radial block elastomer and the like, polyolefin thermoplastic elastomers (e.g., blend type TPO, partially crosslinked blend type TPO, complete crosslinked blend type TPO and the like), poly(vinyl chloride) thermoplastic elastomers (e.g., elastomer blended with nitrile rubber, elastomer blended with partially crosslinked nitrile rubber and the like), polyurethane thermoplastic elastomers (e.g., polyester-polyurethane elastomer, polyether-polyurethane elastomer and the like), polyester thermoplastic elastomers (e.g., polyester-polyether elastomer, polyester-polyester elastomer and the like), and the like;

engineering plastics such as polyamide, polyacetal, thermoplastic polyester, polycarbonate, polyphenyleneoxide, polyphenylene ether, polysulfone, poly(amide imide), poly(ether imide), poly(ether sulfone), poly(ether ketone) and the like; and the like.

The foam of the present invention generally has superior mechanical strength and electric properties. Thus, it can be preferably used for various applications such as an insulating foam layer of an electric communication cable, particularly a high frequency coaxial cable, a thermal insulating material, an acoustic material, a wave absorber and the like. When the foam of the present invention is applied to an insulating foam layer of a high frequency coaxial cable, a nucleator is preferably used, which comprises a fluororesin having superior electric properties to make the dielectric constant and dielectric tangent superior, and a polyolefin to be noted below is preferably used as an organic polymer to be foamed.

As the polyolefin, polyethylene [e.g., high density polyethylene (HDPE), medium density polyethylene (MDPE), low density polyethylene (LDPE), a mixture of HDPE and LDPE, linear low density polyethylene (LLDPE) and the like], polypropylene, a propylene ethylene copolymer wherein a propylene component and an ethylene component are random or block copolymerized, and the like are exemplified. Of these, polyethylene, particularly HDPE, and a mixture of HDPE and LDPE are preferably used from the aspect of expansion ratio. The mixture of HDPE and LDPE generally comprises LDPE in a proportion of 5–900 parts by weight, preferably 10–400 parts by weight, more preferably 100–400 parts by weight, per 100 parts by weight of HDPE.

As used herein, LDPE has a density of not less than 0.910 g/cm$^3$ and not more than 0.925 g/cm$^3$, MDPE has a density of over 0.925 g/cm$^3$ and not more than 0.940 g/cm$^3$, and HDPE has a density of over 0.940 g/cm$^3$ and not more than 0.965 g/cm$^3$. LLDPE is a linear polyethylene having a density of not more than 0.925 g/cm$^3$.

The polyolefin has a preferable melt flow rate (hereinafter to be abbreviated as MFR) which is in the range of 0.1–10 g/10 min, preferably 0.6–8 g/10 min. for polyethylene, and 1–20 g/10 min, preferably 1.5–15 g/10 min, for polypropylene. MFR is measured according to JIS K 7210 under the conditions of load 2.16 kg, temperature 190° C. for polyethylene, and load 2.16 kg, temperature 230° C. for polypropylene.

The foam of the present invention, particularly the foam of polyolefin, preferably has an expansion ratio of at least 70%. However, when the foam of the present invention inclusive of polyolefin foam has an excessively large expansion ratio, the mechanical strength of the foam tends to fall. Therefore, the expansion ratio is preferably not more than 95%, particularly not more than 90%. The expansion ratio of a foam is calculated from the following formula (2) wherein the specific gravity of an organic polymer to be foamed before foaming is Ss and the specific gravity of the foam is Sf. The specific gravities Ss and Sf can be measured by immersion method (A method) according to JIS-K-7112.

$$\text{expansion ratio (\%)}=(Ss-Sf)\times 100/Ss \qquad (2)$$

The foam of the present invention may contain copper inhibitors, antioxidants, coloring agents and other additives as necessary. The additive is preferably contained in an amount of 0.05–2.0 parts by weight, preferably 0.1–1.0 part by weight, per 100 parts by weight of the organic polymer to be foamed.

The foam of the present invention can be produced by extruding a mixture of an organic polymer to be foamed and a nucleator (0.01–1 part by weight per 100 parts by weight of the organic polymer) by a conventional method in the presence of a foaming agent from under a high pressure to a lower pressure.

The foaming agent may be one suitable for the extrusion temperature, foaming conditions, foam forming method and the like. When an insulating foam layer in the final form is to be formed simultaneously with extrusion forming, for example, an inert gas such as nitrogen, carbon gas, helium, argon and the like, hydrocarbon such as methane, propane, butane, pentant and the like, halogenated hydrocarbons such as dichlorodifluoromethane, dichloromonofluoromethane, monochlorodifluoromethane, trichloromonofluoromethane, monochloropentafluoroethane, trichlorotrifluoroethane and the like, and the like are used.

Of these foaming agents, chlorofluorocarbon containing hydrogen atom (e.g., as HCFC22, HCFC123, HCFC124, HCFC142b and the like), fluorocarbon having no chlorine atom, nitrogen, carbon gas, inert gas such as argon and the like are particularly preferable, since they afford a foam having a high expansion ratio and uniform and fine cells. Such foaming agents are non-destructive to the ozone layer and preferable for the protection of environment. Of these, argon is particularly preferable.

The amount of the foaming agent to be used is not particularly limited. Generally, it is 0.001–0.1 part by weight, particularly 0.005–0.05 part by weight, per 100 parts by weight of the organic polymer to be foamed. The foaming agent may be mixed with an organic polymer to be foamed in advance or may be supplied into an extruder from a foaming agent supply opening formed on the barrel of the extruder.

The present invention is hereinafter explained by referring to an example suitable for the production of a coaxial cable. FIG. 1 explains a production apparatus of a coaxial cable, wherein 1 is a conductor delivery device, 2 is a conductor preheater, 3 is a foaming agent supply source, 31 is a foaming agent injection nozzle formed on the barrel of a first extruder 4 to be mentioned later, 4 is the first extruder, 41 is a hopper of the first extruder 4, 42 is a discharge opening of the first extruder 4, 5 is a second extruder, 51 is a discharge opening of the second extruder 5, 6 is a cross head of the second extruder 5, 7 is a condenser, 8 is a cable outer diameter measuring device and 10 is a winding up device. The first extruder 4 is connected to the second extruder 5 via the discharge opening 42 thereof in a T shape.

The pellets of the foamable composition comprising an organic polymer to be foamed, a nucleator and other additives as necessary are cast into a hopper 41 of the first extuder 4 and melted in the first extruder 4. The foaming agent is added into the first extruder 4 with pressure via a foaming agent supply source 3 and a foaming agent injection nozzle 31, and admixed with the above-mentioned melt. Then, the mixture of the foaming agent and the foamable composition mixed in the first extruder 4 is transferred to a second extruder 5 via a discharge opening 42. The transferred mixture is further mixed thoroughly in the second extruder 5 and transferred to a cross head 6 via a discharge opening 51.

The optimal temperature in each barrel of the first extruder 4 and the second extruder 5 varies depending on the kind of the organic polymer to be foamed and the foaming agent. When the organic polymer to be foamed is polyolefin, particularly polyethylene, the temperature in the barrel of the second extruder 5 is preferably adjusted to be lower than the temperature of the first extruder 4 and a little higher than the melting point of the polyolefin resin to be used. When the organic polymer to be foamed is a mixture of HDPE and LDPE, the temperature and pressure in the barrel of the first extruder 4 are preferably adjusted to 180–210° C., 50–150 atm, and those in the barrel of the second extruder 5 are preferably adjusted to 130–140° C., 50–150 atm.

The conductor 11 continuously delivered from the conductor delivery machine 1 runs through a preheater 2, a cross head 6, a condenser 7 and a cable outer diameter measuring device 8, and wound up around a winder 10. On the other hand, the mixture in the second extruder 5 is transferred to the cross head 6 via a discharge opening 51 and supplied on the conductor 11 running continuously, passes through a die (not shown) set on the discharge opening of the cross head 6, extruded into the air for foaming, whereby an insulating foam layer is formed on the conductor 11. This insulating foam layer (not shown) is cooled during the passage through the condenser 7, the outer diameter of which is measured by a cable outer diameter measuring device 8. In this way, a wire 12 with an insulating foam layer thus produced is wound around a winder 10.

Thereafter, a copper corrugate is applied on the wire 12 as an external conductor and a polyethylene sheath thereon by a conventional method to give a coaxial cable.

The present invention is explained in detail by illustrative Examples and Comparative Examples, to which the present invention is not limited in any way.

EXAMPLES 1–6, COMPARATIVE EXAMPLES 1–3

The nucleators of Examples 1–6 and Comparative Examples 1–3, which comprise PTFE particles having the proportions of the main component particles (particle size 0.1–0.5 μm), fine particles (particle size less than 0.1 μm), medium particle size particles (particle size greater than 0.5 μm and less than 5 μm), and large particle size particles (particle size not less than 5 μm), and an average particle size as shown in Table 1 were prepared. The particle size and proportion were measured by laser diffraction/ scattering particle distribution measuring apparatus IA-910 manufactured by HORIBA, LTD. as a microtrack particle distribution analyzer, which is the same as in the following Examples and Comparative Examples.

TABLE 1

|  | Proportion (% by number) | | | | Average |
| --- | --- | --- | --- | --- | --- |
|  | Main particles | Fine particles | Medium particles | Large particles | particle size (μm) |
| Ex. 1 | 52.4 | 0 | 16.0 | 31.6 | 0.42 |
| Ex. 2 | 74.3 | 0 | 13.2 | 12.5 | 0.29 |
| Ex. 3 | 60.2 | 0 | 5.5 | 34.3 | 5.1 |
| Ex. 4 | 55.3 | 0 | 6.7 | 38.0 | 3.2 |
| Ex. 5 | 70.3 | 0 | 7.5 | 22.2 | 0.33 |
| Ex. 6 | 60.1 | 0 | 12.0 | 27.9 | 0.34 |
| Com.Ex.1 | 39.2 | 0 | 0 | 60.8 | 18.9 |
| Com.Ex.2 | 35.6 | 0 | 35.0 | 29.4 | 5.1 |
| Com.Ex.3 | 30.5 | 0 | 11.3 | 58.2 | 19.5 |

EXAMPLES 7–9, COMPARATIVE EXAMPLES 4–6

The nucleators of Examples 7–9 and Comparative Examples 4–6 which comprise PTFE particles having the proportions of the main component particles, fine particles, medium particle size particles, and large particle size particles, and an average nucleator particle size as shown in Table 2 were prepared, as in Examples 1–6 and Comparative Examples 1–3.

TABLE 2

|  | Proportion (% by number) | | | | Average |
| --- | --- | --- | --- | --- | --- |
|  | Main particles | Fine particles | Medium particles | Large particles | particle size (μm) |
| Ex. 7 | 56.0 | 0 | 22.1 | 21.9 | 0.33 |
| Ex. 8 | 62.2 | 0 | 26.9 | 10.9 | 3.0 |
| Ex. 9 | 55.2 | 0 | 20.3 | 24.5 | 0.41 |
| Com.Ex.4 | 32.3 | 0 | 5.9 | 61.8 | 22.2 |
| Com.Ex.5 | 28.6 | 0 | 12.0 | 59.4 | 16.5 |
| Com.Ex.6 | 35.8 | 0 | 19.3 | 44.9 | 17.6 |

EXAMPLES 10–12, COMPARATIVE EXAMPLES 7–9

The nucleators of Examples 10–12 and Comparative Examples 7–9 which comprise PTFE particles having the proportions of the main component particles, fine particles, medium particle size particles, and large particle size particles, and an average nucleator particle size as shown in Table 3 were prepared, as in Examples 1–6 and Comparative Examples 1–3.

TABLE 3

|  | Proportion (% by number) | | | | Average |
| --- | --- | --- | --- | --- | --- |
|  | Main particles | Fine particles | Medium particles | Large particles | particle size (μm) |
| Ex. 10 | 54.5 | 0 | 20.4 | 25.1 | 0.45 |
| Ex. 11 | 62.4 | 0 | 4.3 | 33.3 | 2.1 |
| Ex. 12 | 58.6 | 0 | 18.4 | 23.0 | 0.36 |
| Com.Ex.7 | 32.3 | 0 | 5.9 | 61.8 | 82.3 |
| Com.Ex.8 | 28.6 | 0 | 12.0 | 59.4 | 10.2 |
| Com.Ex.9 | 35.8 | 0 | 19.3 | 44.9 | 28.6 |

EXAMPLES 13–18, COMPARATIVE EXAMPLES 10–12

A foamable composition was obtained by uniformly mixing HDPE having a density of 0.945 g/cm$^3$, MFR 0.8 as an organic polymer to be foamed and nucleator of each Example and Comparative Example as shown in Table 1 in an amount as shown in Table 4 per 100 parts by weight of the organic polymer.

Each of the obtained foamable composition was formed by extrusion foaming on a soft copper wire having an outer diameter of 0.813 mm φ with a two step extruder shown in FIG. 1, having a 25 mm φ first extruder and a 30 mm φ second extruder using an argon gas as a foaming agent to give an insulating cable having an insulating foam layer having an outer diameter of about 10 mm.

During the production, the supply amount of the argon gas was gradually increased to maximize the expansion ratio of the insulating foam layer.

EXAMPLES 19–21, COMPARATIVE EXAMPLES 13–15

In the same manner as in Examples 13–18 and Comparative Examples 10–12 except that HDPE having a density of 0.945 g/cm$^3$, MFR 0.8 was used as an organic polymer to be foamed and nucleators of Examples and Comparative Examples as shown in Table 2 were used in the amount shown in Table 5 per 100 parts by weight of the organic polymer, insulating cables having an insulating foam layer having an outer diameter of about 10 mm were obtained.

EXAMPLES 22–24, COMPARATIVE EXAMPLES 16–18

In the same manner as in Examples 13–18 and Comparative Examples 10–12 except that HDPE having a density of 0.945 g/cm$^3$, MFR 0.8 was used as an organic polymer to be foamed and nucleators of Examples and Comparative Examples as shown in Table 3 were used in the amount shown in Table 6 per 100 parts by weight of the organic polymer, insulating cables having an insulating foam layer having an outer diameter of about 10 mm were obtained.

The expansion ratio (%) of the insulating foam layer of the insulating cables obtained in Examples 13–24 and Comparative Examples 10–18 and average diameter (mm) and uniformity of the cells are shown in Tables 4–6. The average diameter (mm) and uniformity of the cells were measured or evaluated by the following methods.

[Average diameter of cell]

The section of the foam was observed and randomly selected 10 cells were measured for the longer diameter. The average length thereof was taken as the average cell diameter.

[Uniformity of cell]

The section of the foam was observed visually.

Judgement criteria

⊚: the size of all cells is approximately the same

○: slightly greater cells are present in the cells having average size

×: greater cells are present in a proportion of not less than half

TABLE 4

| | Kind of nucleator | Amount of nucleator (parts by weight) | Insulating foam layer | | |
|---|---|---|---|---|---|
| | | | Expansion ratio (%) | Average size of cell (mm) | Uniformity of cell |
| Ex. 13 | Ex. 1 | 0.05 | 77.3 | 0.41 | ⊚ |
| Ex. 14 | Ex. 2 | 0.05 | 77.9 | 0.50 | ⊚ |
| Ex. 15 | Ex. 3 | 0.05 | 76.5 | 0.42 | ⊚ |
| Ex. 16 | Ex. 4 | 0.05 | 78.6 | 0.45 | ○ |
| Ex. 17 | Ex. 5 | 0.05 | 79.3 | 0.48 | ○ |
| Ex. 18 | Ex. 6 | 0.05 | 79.3 | 0.40 | ⊚ |
| Com.Ex.10 | Com.Ex.1 | 0.05 | 77.8 | 1.12 | × |
| Com.Ex.11 | Com.Ex.2 | 0.05 | 75.2 | 0.89 | × |
| Com.Ex.12 | Com.Ex.3 | 0.05 | 76.8 | 0.75 | × |

TABLE 5

| | Kind of nucleator | Amount of nucleator (parts by weight) | Insulating foam layer | | |
|---|---|---|---|---|---|
| | | | Expansion ratio (%) | Average size of cell (mm) | Uniformity of cell |
| Ex. 19 | Ex. 7 | 0.05 | 73.0 | 0.25 | ⊚ |
| Ex. 20 | Ex. 8 | 0.05 | 79.0 | 0.36 | ○ |
| Ex. 21 | Ex. 9 | 0.05 | 77.6 | 0.33 | ⊚ |
| Com.Ex.13 | Com.Ex.4 | 0.05 | 78.9 | 0.78 | × |
| Com.Ex.14 | Com.Ex.5 | 0.05 | 77.4 | 1.15 | × |
| Com.Ex.15 | Com.Ex.6 | 0.05 | 79.4 | 0.88 | × |

TABLE 6

| | Kind of nucleator | Amount of nucleator (parts by weight) | Insulating foam layer | | |
|---|---|---|---|---|---|
| | | | Expansion ratio (%) | Average size of cell (mm) | Uniformity of cell |
| Ex. 22 | Ex. 10 | 0.05 | 78.4 | 0.48 | ○ |
| Ex. 23 | Ex. 11 | 0.05 | 77.9 | 0.45 | ○ |
| Ex. 24 | Ex. 12 | 0.05 | 76.5 | 0.41 | ⊚ |
| Com.Ex.16 | Com.Ex.7 | 0.05 | 80.0 | 0.66 | × |
| Com.Ex.17 | Com.Ex.8 | 0.05 | 74.6 | 0.78 | × |
| Com.Ex.18 | Com.Ex.9 | 0.05 | 79.5 | 0.96 | × |

From Table 4–Table 6, it is evident that the use of the nucleators of Examples resulted in fine and uniform cells as compared to the use of the nucleators of Comparative Examples.

The nucleator of the present invention can produce a foam, particularly a foam of polyolefin, having an expansion ratio of not less than 50%, preferably not less than 70%, and having fine cells uniformly foamed, by the use thereof in a small amount of about 0.05 part by weight per 100 parts by weight of the organic polymer to be foamed. By selecting and using a fluororesin having superior electric properties as a nucleator, a foam capable of forming an insulating foam layer of a high frequency coaxial cable and having superior electric properties and mechanical strength can be produced. In addition, the nucleator of the present invention is economical and effective by the use of an extremely small amount thereof. As a consequence, foams for various uses can be produced at lower costs.

This application is based on a patent application No. 10-244754 filed in Japan, the content of which is hereby incorporated by reference.

What is claimed is:

1. A foam which comprises a formable organic polymer and a fluororesin powder comprising particles having a particle size of 0.1–0.5 $\mu$m in a proportion of at least 50% by number and particles having a particle size of not less than 5 $\mu$m in a proportion of not more than 40% by number in a proportion of 0.01–1 part by weight per 100 parts by weight of the organic polymer.

2. The foam of claim 1, wherein the organic polymer is at least one member selected from the group consisting of a high density polyethylene, a low density polyethylene and a linear low density polyethylene.

3. The foam of claim 1, wherein the expansion ratio is at least 50%.

4. The foam of claim 1, wherein the foam is for an insulating foam layer of a coaxial cable.

5. A coaxial cable having an insulating foam layer comprising a formable organic polymer and a fluororesin powder comprising particles having a particle size of 0.1–0.5 $\mu$m in a proportion of at least 50% by number per 100 parts by weight of the organic polymer and particles having a particle size of not less than 5 $\mu$m in a proportion of not more than 40% by number per 100 parts by weight of the organic polymer.

6. A production method of a foam, comprising mixing a formable organic polymer and a nucleator for foaming which comprises a fluororesin powder comprising particles having a particle size of 0.1–0.5 $\mu$m in a proportion of at least 50% by number and particles having a particle size of not less than 5 $\mu$m in a proportion of not more than 40% by number in a proportion of 0.01–1 part by weight per 100 parts by weight of the organic polymer, and extruding the mixture in the presence of a foaming agent in an atmosphere of from a high pressure to a lower pressure.

7. A foamable composition comprising a fluororesin powder comprising particles having a particle size of 0.1–0.5 $\mu$m in a proportion of at least 50% by number and particles having a particle size of not less than 5 $\mu$m in a proportion of not more than 40% by number and a formable organic polymer.

8. The foamable composition of claim 7, wherein the fluororesin powder has an average particle size of 0.2–10 $\mu$m.

9. The foamable composition of claim 7, wherein the fluororesin powder is at least one member selected from the group consisting of a polytetrafluoroethylene powder, a tetrafluoroethylene-perfluoroalkyl vinyl ether copolymer powder and an ethylene tetrafluoroethylene copolymer powder.

10. The foamable composition of claim 7, wherein the organic polymer is at least one member selected from the group consisting of a high density polyethylene, a low density polyethylene and a linear low density polyethylene.

11. The foamable composition of claim 7, wherein the fluororesin powder is contained in a proportion of 0.01–1 part by weight per 100 parts by weight of the organic polymer.

* * * * *